United States Patent Office 3,579,592
Patented May 18, 1971

3,579,592
1-ALLYLTHIO-3-CHLORO-2-PROPANOL
Leonard Levine, Lake Jackson, and Russell T. McFadden, Freeport, Tex., assignors to The Dow Chemical Company, Midland, Mich.
No Drawing. Filed Oct. 22, 1968, Ser. No. 769,706
Int. Cl. C07c *149/18;* A61k *27/00;* C08f *15/00*
U.S. Cl. 260—609
4 Claims

ABSTRACT OF THE DISCLOSURE 1-allylthio-3-halo-2-propanol is made by reacting an allyl halide with 1-mercapto-3-halo-2-propanol, wherein the halogen in each reactant has an atomic weight of at least 35, in the presence of a hydrogen halide acceptor. The compound is used as an anthelmintic.

This invention relates to new compositions and to a method of their preparation and more particularly pertains to compounds of the structure $$CH_2=CH-CH_2-S-CH_2CHOHCH_2X$$

where X is a halogen atom and to a method of preparing the compounds by reacting an allyl halide with 1-mercapto-3-halo-2-propanol, wherein the halogen in each reactant has an atomic weight of at least 35, in the presence of a hydrogen halide acceptor.

The allyl halide which can serve as a reactant can be allyl chloride, allyl bromide or allyl iodide. The halogen in the 1-mercapto-3-halo-2-propanol can be chlorine, bromine or iodine. Any one or any mixture of the above allyl halides can be reacted with one or any mixture of said 1 - mercapto-3-halo-2-propanols. In any event the halogen remaining on the new compounds is that present on the 1-mercapto-3-halo-2-propanol.

The molar ratio of allyl halide to 1-mercapto-3-halo-2-propanol should be at least 1 to 1 and preferably a molar excess of 50–300% of the allyl halide is preferred.

The molar quantity of hydrogen halide acceptor should be approximately equal to the molar quantity of 1-mercapto-3-halo-2-propanol, although lower quantities of the hydrogen halide acceptor can be used with at the sacrifice of yield of desired product. It is preferred not to use an excess of hydrogen halide acceptor for the reason that such excess tends to reduce yield of the desired end product by reacting with the halogen of the mercapto-halopropanol.

Representative hydrogen halide acceptors are alkali metal and alkaline earth metal oxides, hydroxides and carbonates, ammonium hydroxide, ammonium carbonate, alkaline reacting tertiary amines, and quaternary ammonium hydroxides. The preferred hydrogen acceptors are sodium or potassium carbonates, and hydroxides.

The reaction can be carried out without a diluent, but it is preferred to use the hydrogen halide acceptor in solution. The preferred solvent for the hydrogen halide acceptor is water, because work-up procedures are simplified through its use. Other diluents which can be employed include alcohols, ketones, ethers and esters. Typical diluents are methanol, ethanol, propanols, butanols, pentanols, hexanols, heptanols, octanols, acetone, methyl ethyl ketone, diethyl ketone, methyl butyl ketone, diethyl ether, diisopropyl ether, dibutyl ether, tetrahydrofuran, dioxane, ethyl acetate, propyl acetate, butyl acetate and isobutyl acetate.

The reaction can be carried out at any temperature from about −10 to 75° C., but it is preferred to run it at 20–40° C. because such temperature is easily controllable with ordinary cooling water.

Pressure has no effect on the reaction. Thus, it can be carried out at autogenous or atmospheric pressure, or at superimposed pressure.

Since the allyl halide and mercaptohalopropanol each has a labile halogen it is essential that both reactants be present in the reaction vessel in the proper ratio when contacted with the hydrogen halide acceptor. The preferred procedure is to prepare a mixture containing 50–300% molar excess of allyl halide and the 1-mercapto-3-halo-2-propanol and slowly add about an equimolar quantity, based on the mercaptohalopropanol, of a hydrogen halide acceptor in solution. Alternatively, the individual ingredients can be metered continuously into a reaction zone and withdrawn continuously to a separation zone, or separate streams of the allyl halide and the hydrogen halide acceptor can be run into a reactor containing a mixture of the 1-mercapto-3-halo-2-propanol and the allyl halide. This latter procedure permits ready control of the amount of excess allylhalide in the reactor. However, because of simplicity of operation the batch procedure first described above is preferred.

The compounds of the invention are useful per se as anthelmintics. When tested at .06% by weight concentration in an experimental food it was found that 95% control of pig ascarids was obtained. The compounds are also useful for the preparation of epoxides having the structure

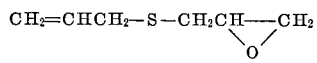

by dehydrohalogenation of the corresponding hydroxy halide. The new compounds and their epoxy derivatives can also be copolymerized with a wide variety of olefinic polymerizable compounds, such as styrene, ethylene, propylene, vinyl chloride, vinylidene chloride, acrylic and methacrylic acids or their esters, acrylonitrile, methacrylonitrile, esters of vinyl alcohol, butadiene or isoprene. Preferably, the amount of

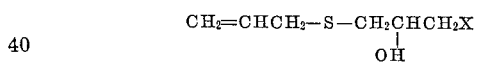

or its epoxide should be present in proportions no greater than equimolars based on the other monomer mentioned above. Polymers containing the allyl thioether hydroxy halides can be used as coating materials or as films or sheeting. The halide forms of the copolymers can be readily cross-linked with polybasic acids or polyvalent metal oxides of hydroxides. The epoxy forms of the copolymers can be readily cross-linked by catalytic openings of the epoxy group, using known procedures.

The example which follows is intended to illustrate the invention not to limit it. All parts are by weight unless specifically indicated otherwise.

EXAMPLE 1

Three moles of allyl chloride and one mole of 1-mercapto-3-chloro - 2 - propanol were blended in a flask equipped with a thermometer, stirrer and dropping funnel. An aqueous solution of one mole of $K_2CO_3$ in 500 ml. water was added dropwise to the stirred organic solution. The reaction was somewhat exothermic and required external cooling to maintain the temperature at 25–30° C. during the addition of the $K_2CO_3$ solution. The final mixture was allowed to stand overnight at room temperature. The organic layer, which was separated from the bottom aqueous layer, was washed with aqueous sodium chloride and then dried over anhydrous calcium sulfate. The dried organic mixture was filtered and stripped of volatile materials. Vacuum distillation of the residue yielded 97 parts, 58% yield, of the desired product. The portion boiling at 80–82° C. at 0.8 mm. pressure had a refractive index of 1.5220. Analysis of the compound showed that it contained 43.0% C, 18.8% S, 6.75% H, 9.7% OH, and 21.3% Cl. The structure $$CH_2=CHCH_2SCH_2CHOH_2Cl$$

was confirmed by infrared spectroscopy and nuclear magnetic resonance spectroscopy.

The substitution of iodine or bromine containing analogs for the 1-mercapto-3-chloro-2-propanol yields corresponding analogues.

We claim:
1. Compounds of the structure

$$CH_2=CHCH_2-S-CH_2CHOHCH_2X$$

in which X is a halogen having an atomic weight of at least 35.

2. A compound of claim 1 in which X is chlorine.
3. A compound of claim 1 in which X is bromine.
4. A compound of claim 1 in which X is iodine.

References Cited

UNITED STATES PATENTS 3,147,181   9/1964   Hopkins et al. _____ 260—609

CHARLES B. PARKER, Primary Examiner

D. R. PHILLIPS, Assistant Examiner

U.S. Cl. X.R.

260—79.7, 348.6; 424—337